Patented Oct. 10, 1944

2,360,206

UNITED STATES PATENT OFFICE 2,360,206

COMPOSITION OF MATTER AND METHOD OF PREPARATION

Richard F. B. Cox, Wilmington, Del., assignor to Hercules Powder Company, Wilmington, Del., a corporation of Delaware No Drawing. Application December 31, 1943, Serial No. 516,513

6 Claims. (Cl. 260—97)

This invention relates to a new composition of matter and to a method for its preparation. More particularly, it relates to an oximino lactone of a resin acid and a method for the preparation thereof.

Although in the art various rosins and resin acids have been treated with nitrosyl derivatives such as nitrosyl chloride and oxides of nitrogen, the products have in no cases been oximino lactones.

Now, in accordance with this invention, it has been found that dihydroabietic acid melting at 147°–148° C. may be treated with a nitrosating agent, to produce an oximino lactone of a resin acid of the formula $C_{20}H_{31}O_3N$. Thus, it has been found that by treating dihydroabietic acid melting at 147°–148° C. with an anhydride of nitrous acid under conditions which favor the addition of the nitrosyl derivative to the double bond, a lactone of oximinohydroxytetrahydroabietic acid is produced.

Having now indicated in a general way the nature and purpose of the invention, there follows a more detailed description of the invention in the form of examples. All parts expressed in the examples represent parts by weight unless otherwise indicated.

Example 1

Ten parts of dihydroabietic acid, melting at 147°–148° C. and having a specific rotation $(\alpha)_D+68°$ when in 2% solution in ethyl alcohol, were dissolved in 75 parts of glacial acetic acid by warming. Then 7.2 parts of butyl nitrite were added and dry hydrogen chloride bubbled through the solution at 25° C. The mixture turned dark and then became light amber in twenty minutes, at which time the treatment was stopped. The mixture was then cooled and filtered to remove the crystals which had formed. These crystals, weighing 2.5 parts, were white in color and melted at 169°–170° C. after washing with methanol. After recrystallization from a chloroform and methanol mixture, the crystals melted at 184°–185° C. and had a specific rotation $(\alpha)_D-30°$ when in 2% solution in chloroform. The final material was found to be a lactone of oximinohydroxytetrahydroabietic acid.

Example 2

Three parts of dihydroabietic acid melting at 147°–148° C. and having an optical rotation $(\alpha)_D+68°$ when in 2% solution in ethyl alcohol were dissolved in 50 parts of glacial acetic acid containing 1.8 parts of butyl nitrite; then 50 parts of glacial acetic acid containing 2 parts dry hydrogen chloride were added. Upon standing at 25° C. the mixture turned dark amber, but within two hours became light blue and white crystals separated. The white crystals were filtered out and washed with alcohol in which they were insoluble. These crystals were recrystallized from a mixture of chloroform and methanol, after which they melted at 184°–185° C. and had a specific rotation $(\alpha)_D-30°$ when dissolved to the extent of 2% in chloroform. The yield was 1 part. The theoretical nitrogen content based on the formula $C_{20}H_{31}O_3N$ was calculated to be 4.2%. Analysis of the crystals found them to contain 4.33% nitrogen.

Example 3

To a solution of 3 parts dihydroabietic acid, melting at 147°–148° C. and having a specific rotation $(\alpha)_D+68°$ (2% in alcohol), in 50 parts glacial acetic acid were added 1.8 parts butyl nitrite followed by the addition at 20° C. of 50 parts glacial acetic acid containing 3 parts concentrated nitric acid. The resulting solution turned light blue and crystals formed. These crystals, weighing 2 parts, were colorless and, after recrystallization from a mixture of chloroform and methanol, melted at 184°–185° C., had a specific rotation $(\alpha)_D-30°$ (2% in chloroform), and were neutral in reaction. The calculated nitrogen content of a compound having the empirical formula $C_{20}H_{31}O_3N$ was 4.2% and 4.33% was found by analysis of the crystals.

Example 4

A mixture of 42 parts of dihydro acids prepared by the reaction of methyl magnesium iodide on the lactone of hydroxytetrahydroabietic acid was dissolved in 300 parts of glacial acetic acid. Then 27 parts of butyl nitrite and 450 parts of glacial acetic acid containing 31 parts of hydrogen chloride were added. After about two hours, crystals formed which were removed by filtration and found to weigh 3 parts. These crystals were white and, after being boiled with methanol and dried, melted at 171°–172° C. and had a rotation $(\alpha)_D-28°$ (2% in chloroform). The melting point after recrystallization was 184°–185° C. and the rotation $(\alpha)_D$ was $-30°$ when dissolved to the extent of 2% in chloroform.

Example 5

Ten parts of dihydroabietic acid, melting at 147°–148° C. and having a rotation $(\alpha)_D+68°$ when in 2% solution in ethyl alcohol, were dissolved in 75 parts of glacial acetic acid by warming. Then 6 parts of sodium nitrite in 5 parts water were added and dry hydrogen chloride bubbled through the solution at 25° C. The mixture turned dark and then became light amber in twenty minutes, at which time the treatment was stopped. The mixture was then cooled and filtered to remove the crystals which had formed. These crystals, weighing 2.5 parts, were white in color and melted at 169°–170° C. after washing with methanol. After recrystallization from a chloroform and methanol mixture, the crystals melted at 184°–185° C. and had a specific rotation $(\alpha)_D$—30° when in 2% solution in chloroform. The final material was found to be a lactone of oximinohydroxytetrahydroabietic acid.

Example 6

Three parts of dihydroabietic acid, melting at 147°–148° C. and having an optical rotation $(\alpha)_D+68°$ when in 2% solution in ethyl alcohol, were dissolved in 50 parts of glacial acetic acid containing 1.5 parts of nitrosyl chloride. Upon standing at 25° C. the mixture turned dark amber, but within two hours became light blue and white crystals separated. The white crystals were filtered out and washed with alcohol in which they were insoluble. These crystals were recrystallized from a mixture of chloroform and methanol, after which they melted at 184°–185° C. and had a specific rotation $(\alpha)_D$—30° when dissolved to the extent of 2% in chloroform. The yield was 1 part. The theoretical nitrogen content based on the formula $C_{20}H_{31}O_3N$ was calculated to be 4.2%. Analysis of the crystals found them to contain 4.33% nitrogen.

The dihydroabietic acid used in this invention may be prepared by treating the lactone of hydroxytetrahydroabietic acid melting at 131°–132° C. with a Grignard reagent. Purification may be accomplished by separating the mixture of dihydroabietic acids thus formed from the reaction product and obtaining the desired dihydroabietic acid by fractional crystallization. For example, the dihydroabietic acid melting at 147°–148° C. may be prepared by adding gradually 30.4 parts of the lactone of hydroxytetrahydroabietic acid melting at 131°–132° C., dissolved in 100 parts of dry benzene, to 16.6 parts of methyl magnesium iodide prepared by combining 15 parts of methyl iodide with 2.3 parts of magnesium in 50 parts of ether, and, when the addition is complete, heating the mixture for five hours at 80°–100° C. and pouring the reaction product into 125 parts of ice water containing 25 parts of ammonium chloride. The benzene layer may then be extracted with 300 parts of 2% sodium hydroxide solution. This extract is composed of a mixture of the salts of two dihydroabietic acids, one of melting point 185°–186° C. and the other melting at 147°–148° C. The mixture of acids may be recovered by acidification and separation from the mother liquor by filtration or by other means for separating solids from liquids. The dihydroabietic acid useful in this invention melts at 147°–148° C. and has a rotation $(\alpha)_D+68°$ when in 2% solution in ethyl alcohol. It may be further separated from the mixture of dihydroabietic acids obtained as described above by fractional crystallization from a solvent such as ethyl acetate from which the desired acid crystallizes in the form of stubby prisms.

The dihydroabietic acid melting at 147°–148° C. useful in the process of this invention may be used in its purified form or in its admixture with the dihydroabietic acid melting at 185°–186° C., the latter acid not forming the lactone of oximinohydroxytetrahydroabietic acid. Although the above described method for the preparation of the dihydroabietic acid melting at 147°–148° C. is a convenient one, the usefulness of this acid in the present invention is not dependent upon any one specific method of preparation.

The reaction of dihydroabietic acid melting at 147°–148° C. with the nitrosating agent may be carried out in any inert solvent. By inert solvent is meant one which will dissolve the reactants and which will not react preferentially either with the nitrosating agent to form an inactive compound or with the lactone of oximinohydroxytetrahydroabietic acid produced by the reaction. Such solvents as acetic acid, dioxane, ether, ethanol, butanol, etc., may be used. Glacial acetic acid is a preferred solvent for the reaction. The reaction may also be carried out under conditions where one of the reactants acts as the solvent. Thus, in reactions where butyl nitrite and an acid are used as the source of nitrosyl chloride, the butyl nitrite may serve as the reaction solvent.

The nitrosating agent may be an anhydride of nitrous acid or other oxides of nitrogen such as nitrogen tetroxide, nitrogen trioxide, etc., or may be a mixed anhydride of nitrous acid and another acid such as nitrosyl chloride, nitrosyl bromide, nitrosyl nitrate, nitrosyl sulfuric acid, nitrosyl acetate, etc., and may be added as a gas or liquid or produced in situ from materials such as butyl nitrite, amyl nitrite, sodium nitrite, potassium nitrite, etc. through reaction with a strong acid such as nitric acid, hydrogen chloride, hydrogen bromide, sulfuric acid, etc. Preferably, the nitrosating of the dihydroabietic acid will be carried out by the addition of dry hydrogen chloride in an inert solvent to a solution of the dihydroabietic acid in an inert solvent containing butyl nitrite.

The temperature of the reaction may vary from about —20° to about 60° C., but preferably will be about 0° to about 30° C. The temperature in any case should not be so low as to freeze the solvent, thus preventing adequate mixing of the ingredients.

The reaction time may be from about fifteen minutes to about four hours, but more preferably from about one hour to about two hours.

The crystals of the lactone of oximinohydroxytetrahydroabietic acid may be recovered from the reaction mixture by cooling the latter and separating the crystals thus formed by filtration, centrifugation or other means of separating the crystals of the lactone of oximinohydroxytetrahydroabietic acid from the mother liquor. These crystals may form spontaneously without cooling if the process is carried out in the preferred temperature range of 0° to 30° C.

The lactone of oximinohydroxytetrahydroabietic acid produced according to this invention is white in color, melts at 184°–185° C., and has an optical rotation $(\alpha)_D$—30° when in 2% solution in chloroform. It is insoluble in ethyl alcohol. This oximino lactone is a valuable starting material for synthesis of hydrophenanthrene and hydronaphthalene types of compound.

What I claim and desire to protect by Letters Patent is:

1. As a new composition of matter, a lactone of oximinohydroxytetrahydroabietic acid melting at 184°–185° C. and having an optical rotation $(\alpha)_D$—30° when in 2% solution in chloroform.

2. A process for producing an oximino lactone of a resin acid of the formula $C_{20}H_{31}O_3N$ which comprises treating dihydroabietic acid melting at 147°–148° C. with a nitrosating agent.

3. A process for producing a lactone of oximinohydroxytetrahydroabietic acid which comprises treating the dihydroabietic acid melting at 147°–148° C. with an anhydride of nitrous acid.

4. A process for producing a lactone of oximinohydroxytetrahydroabietic acid which comprises treating the dihydroabietic acid melting at 147°–148° C. with a mixed anhydride of nitrous acid and another acid.

5. A process for producing a lactone of oximinohydroxytetrahydroabietic acid melting at 184°–185° C. and having a rotation $(\alpha)_D -30°$ in 2% solution in chloroform which comprises treating the dihydroabietic acid melting at 147°–148° C. with butyl nitrite and dry hydrogen chloride under conditions which favor the addition of the nitrosyl derivative to the double bond.

6. A process for producing a lactone of oximinohydroxytetrahydroabietic acid melting at 184°–185° C. and having a rotation $(\alpha)_D -30°$ in 2% solution in chloroform, which comprises treating the dihydroabietic acid melting at 147°–148° C. with butyl nitrite and dry hydrogen chloride under conditions which favor the addition of the nitrosyl derivative to the double bond and separating the lactone of oximinohydroxytetrahydroabietic acid from the reaction mixture.

RICHARD F. B. COX.